Jan. 28, 1936. M. MATHIESEN 2,028,986
TIRE SPREADING IMPLEMENT
Filed Oct. 1, 1934
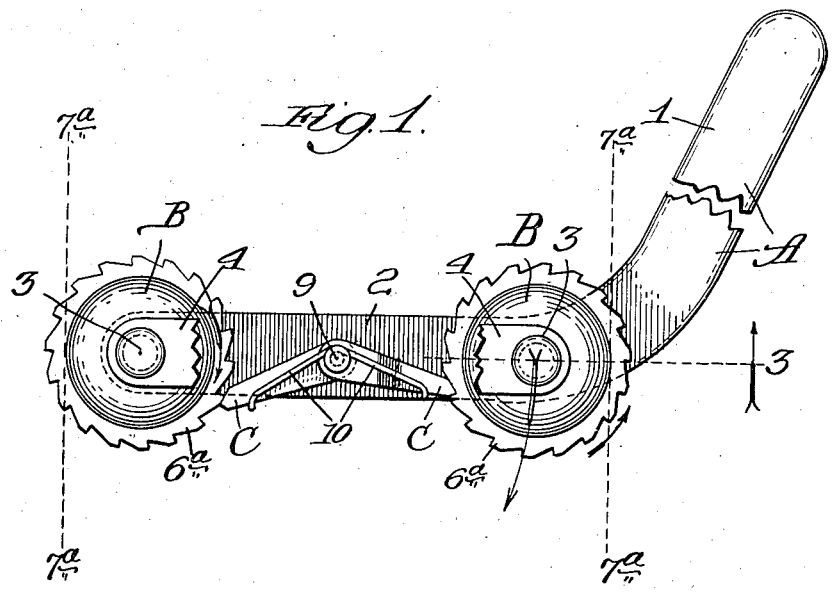
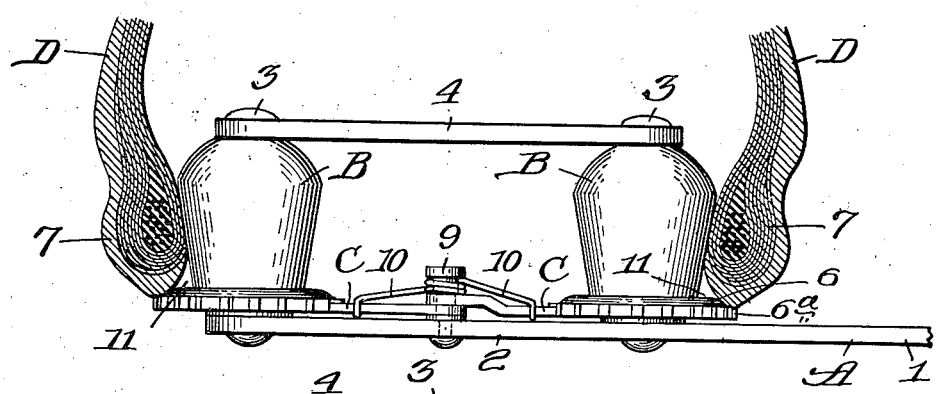
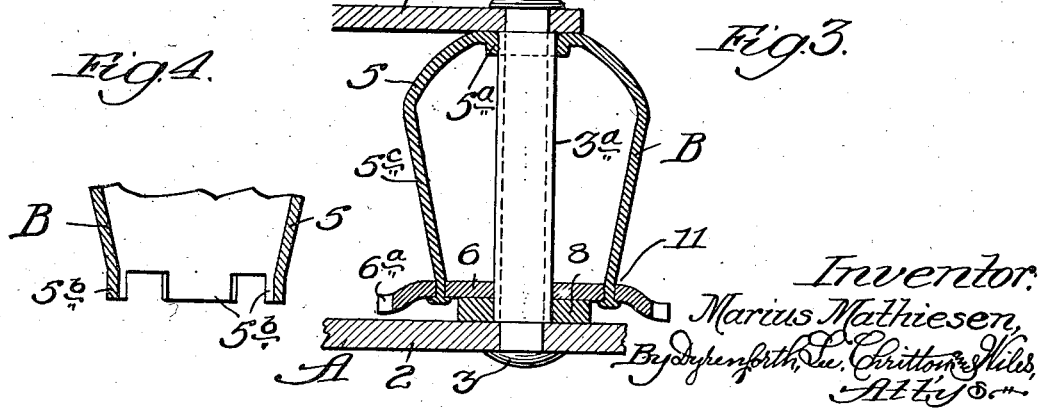
Inventor.
Marius Mathiesen, Patented Jan. 28, 1936

2,028,986

UNITED STATES PATENT OFFICE 2,028,986

TIRE SPREADING IMPLEMENT

Marius Mathiesen, Chicago, Ill., assignor to John H. Lee, River Forest, Ill.

Application October 1, 1934, Serial No. 746,446

8 Claims. (Cl. 152—27)

This invention relates particularly to an implement for use in opening up a tire to enable its inner surface to be examined. The primary object is to provide an implement of simple and inexpensive character by means of which the interior of a tire can be inspected and examined thoroughly in a facile manner.

The invention is illustrated in a preferred embodiment in the accompanying drawing, in which—

Fig. 1 is a broken plan view of the device; Fig. 2, a broken edge elevational view; Fig. 3, an enlarged broken sectional view taken as indicated at line 3 of Fig. 1; and Fig. 4, a detail illustrating a preferred construction of the tire-spreading rollers employed.

In the preferred embodiment, the device comprises a hand-lever A; laterally projecting, spaced tire-spreading rollers B carried by the shank-portion of the hand-lever; and spring-held pawls C mounted between the rollers and engaging ratchet-teeth with which the rollers are provided.

The ratchet-devices are reversely acting, so that the tire-spreading rollers, which are adapted to travel between the flanges of the tire, will alternately serve as fulcrums when the hand-lever is oscillated. In this manner, the tire-spreading rollers may be caused to advance around the tire, spreading the tire at successive portions to enable the interior to be thoroughly inspected.

The hand-lever A is shown as consisting of a rigid steel bar having a handle-portion 1 and a shank-portion 2 at an angle to the handle-portion. That is, the bar is bent edgewise to provide a relatively short shank portion and a relatively long handle-portion. While the size may be as desired, it is convenient to have the shank portion, for an ordinary pleasure-car tire, of a length of about 4"–6", and to have the handle-portion of a length of about 20"–24".

In Fig. 2, the relation of the implement to a tire D is illustrated, but it will be understood that this view is reversed from the position in which the tire-spreader ordinarily is used. That is, in practice, the shank portion of the implement will be introduced into the lower portion of the tire when the tire is in standing position, and the handle-portion of the implement will then be turned downwardly to something approaching a horizontal plane, after which the implement may be manipulated to open successive portions of the tire, the position of the tire on the floor being changed from time to time as the work of inspection progresses.

The tire-spreading rollers B may be considered, broadly, as enlarged studs projecting laterally from the shank of the handle-bar. However, it is important to employ rollers to facilitate the action of spreading the tire, and it is important to provide means for locking or latching the rollers, alternately, in such manner that one roller may travel freely while the other one is in locked condition and serving as a fulcrum.

In the illustration given, the rollers are secured to the shank 2, as by means of bolts 3 and a short bar 4, which is spaced laterally from the shank 2, so that the rollers are disposed between said shank and the bar 4. Appropriate means for spacing the bar 4 is provided. In the illustration given, sleeves $3^a$ are employed, the bolts extending through the sleeves, and the rollers B are journaled on the sleeves, or tubes, $3^a$.

The rollers B, preferably, are formed from sheet metal by suitable stamping operations. They are shown as generally in the form of cups 5 whose bottoms are provided with bearings $5^a$ which are journaled on the sleeves $3^a$. The cups are secured at their open ends to disks 6 whose peripheral portions project and are provided with ratchet-teeth, as indicated at $6^a$. The projecting portions may be regarded as flanges which are adapted to ride, or travel, on the extreme edge-portions of the flanges 7 of the tire. Washers 8 may be interposed between the disks 6 and the shank 2, as shown in Fig. 3. The preferred manner of securing the cups 5 to the disks 6 is to provide the free edge-portions of the cups with projections $5^b$ which extend through slots or perforations in the disks 6 and are secured by riveting.

The pawls, or dogs, C, are shown supported on a pivot 9, which projects laterally from the shank 2; and a spring, or springs, 10 serve to hold the pawls in engagement with the ratchet-teeeth $6^a$. Preferably, the projecting peripheral portions of the disks 6 are pressed outwardly towards the shank 2, as shown in Figs. 2 and 3. The cups 5 have convergent portions $5^c$. That is, the walls taper somewhat towards the disks 6, thus leaving between the cups and the disks a re-entrant angle, or peripheral recess, 11, engaged by the flanges of the tire as shown in Fig. 2.

It will be noted from Fig. 1 that the ratchet-teeth with which the two rollers are equipped are reversed with respect to each other; also, that the pawls are reverse pawls. If, in Fig. 1, it be considered that the lines of contact between the rollers and the tire-flanges 7 are indicated by the dotted lines 7ª, it will be noted that if the handle-portion 1 be depressed, the roller B at the free end of the shank 2 will become locked against rotating counter-clockwise and will thus serve as a fulcrum, while the other roller will be left free to rotate counter-clockwise. Thus, the latter roller will be free to travel downwardly along the line 7ª a short distance. The large arrow shown in Fig. 1 indicates this movement, the roller at the right rotating in the direction of the arrow thereon. Then the movement of the handle portion 1 is reversed, whereupon the roller at the junction of the handle-portion and shank-portion becomes locked against rotation clockwise while the other roller is left free to rotate clockwise as shown by the arrow thereon and travel downwardly along the corresponding line 7ª. By manipulations of this kind, the implement may be caused to travel around the tire, progressively opening portions of the tire and permitting inspection of the interior. This renders it comparatively easy to inspect the interior for fabric-ruptures, tacks, nails, or the like.

The foregoing detailed description has been given for clearness of understanding only, and no unnecessary limitations should be understood therefrom, but the appended claims should be construed as broadly as permissible in view of the prior art.

What I claim as new and desire to secure by Letters Patent is:

1. A tire-spreading implement comprising a rigid hand-lever, a pair of laterally projecting rollers journaled on said hand-lever, and means for alternately holding said rollers automatically to enable first one and then the other to serve as a fulcrum in the operation of progressively opening portions of the tire.

2. A tire-spreading implement comprising a rigid hand-lever, a pair of ratchet-equipped rollers mounted thereon, the teeth of the ratchets being reversed, and pawls mounted on said lever coacting with the ratchets, whereby the rollers may serve alternately as fulcrums in the operation of progressively opening portions of the tire.

3. A tire-spreading implement comprising a rigid hand-lever having a relatively short shank and a relatively long handle-portion at an angle thereto, laterally projecting tire-spreading rollers carried by said shank, and reversely arranged ratchet-devices adapted to latch one roller while the other is left free to travel, and vice versa.

4. A tire-spreading implement comprising a rigid hand-lever, studs projecting laterally from one end portion of said hand-lever, rollers journaled on said studs and equipped adjacent one side of said hand-lever with ratchet-wheels, and pawls mounted on said hand-lever between said ratchet-wheels and engaging the teeth thereof, the teeth of the ratchet-wheels being reversely arranged.

5. A tire-spreading implement comprising a rigid hand-lever having a relatively short shank-portion and a relatively long handle-portion, said hand-lever comprising a bar bent edgewise to form the two portions mentioned, ratchet-equipped rollers mounted on said shank-portion and projecting laterally therefrom, and pawls coacting with said ratchet-equipped rollers and adapted to alternately latch them to enable first one and then the other to serve as a fulcrum.

6. An implement as specified in claim 5, in which the ratchet-equipped rollers consist of journaled cups and toothed disks applied to the ends of said cups which are adjacent said shank-portion.

7. A tire-spreading implement comprising a rigid angular hand-lever, a pair of tire-spreading rollers journaled on one end-portion of said hand-lever and equipped adjacent the hand-lever with reversely toothed ratchet-wheels, the rollers and ratchet-wheels being shaped to provide between them peripheral recesses adapted to engage beads of tire-flanges, and pawls mounted on said hand-lever coacting with said ratchet-wheels.

8. A tire-spreading implement comprising a rigid hand-lever equipped with reversely acting pawls, studs projecting laterally from said hand-lever, a relatively short bar connecting the free ends of said studs, and tire-spreading rollers journaled on said studs between said bar and hand-lever, said rollers being equipped with reversely-toothed ratchets engaged by said pawls.

MARIUS MATHIESEN.